United States Patent
Sako et al.

(10) Patent No.: US 6,731,578 B1
(45) Date of Patent: May 4, 2004

(54) OPTICAL DISK RECORDING AND/OR REPRODUCING DEVICE, AND FOCUSING SERVOMECHANISM

(75) Inventors: Yoichiro Sako, Tokyo (JP); Hiroshi Ogawa, Kanagawa (JP); Tatsuya Inokuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 438 days.

(21) Appl. No.: 09/763,780
(22) PCT Filed: Jun. 28, 2000
(86) PCT No.: PCT/JP00/04257
   § 371 (c)(1),
   (2), (4) Date: Feb. 27, 2001
(87) PCT Pub. No.: WO01/01405
   PCT Pub. Date: Jan. 4, 2001

(30) Foreign Application Priority Data

Jun. 28, 1999  (JP) ............................................. 11-182591

(51) Int. Cl.⁷ .................................................. G11B 7/00
(52) U.S. Cl. .................................. 369/53.23; 369/53.22; 369/94
(58) Field of Search .......................... 369/44.25, 44.27, 369/44.29, 44.35, 94, 53.22, 53.23

(56) References Cited

U.S. PATENT DOCUMENTS 5,682,372 A * 10/1997 Yamakawa et al. ........... 369/94
5,793,720 A *  8/1998 Nishikata .................. 369/44.25
5,903,530 A *  5/1999 Tateishi et al. .......... 369/44.25

FOREIGN PATENT DOCUMENTS

JP         10097756 A  *  4/1998

* cited by examiner

Primary Examiner—Thang V. Tran
(74) Attorney, Agent, or Firm—Jay H. Maioli

(57) ABSTRACT

An optical disc recorder and/or player using as a recording medium an optical disc having a plurality of recording layers formed one over another includes an optical pickup having a photodetector to direct a light beam towards any one of the plurality of recording layers and detect a return light beam from a recording layer, and an identifier to compare an output signal from the photodetector with a predetermined reference value and identify, based on a comparison result, which one of the plurality of recording layers formed in the optical disc has focused thereon the light beam from the optical pickup.

26 Claims, 3 Drawing Sheets

OPTICAL DISK RECORDING AND/OR REPRODUCING DEVICE, AND FOCUSING SERVOMECHANISM

TECHNICAL FIELD

The present invention relates to an optical disc recording and/or playback apparatus and method, for playback of information signal recorded in an optical disc having a plurality of recording layers or data layers, and also to a focus servo controller and focus servo pull-in method, for controlling the focusing of a light beam to any one of a plurality of recording layers.

BACKGROUND ART

Conventionally, as a recording medium for a variety of information such as audio information, video information, etc., optical discs are widely used from which information recorded therein is read out optically, namely, using a light beam. There have recently been proposed such optical discs having formed therein many recording layers for the purpose of recording a further increased amount of information.

An optical disc having a plurality of recording layers formed therein is known from the disclosure in the Japanese Unexamined Patent Publication No. 8-235641.

Referring now to FIG. 1, there is illustrated in the form of a sectional view a conventional optical disc, that is, the optical disc having a plurality of recording layers as in the above Japanese Unexamined Patent Publication No. 8-235641. As shown in FIG. 1, the optical disc, generally indicated with a reference 1, includes a first record carrier 4a having a first recording layer 3a formed on one side of a first substrate 2a which is light-transmissive and a second record carrier 4b having a second recording layer 3b formed on one side of a second substrate 2b which is also light-transmissive. The first and second record carriers 4a and 4b are joined to each other with the sides of the first and second recording layers 3a and 3b having formed thereon the first and second recording layers 3a and 3b, respectively, being opposite to each other as well as with a light-transmissive adhesive layer 5 being disposed between the first and second record carries 4a and 4b.

Information such as video information or the like is recorded as pit patterns 6a and 6b each defined by tiny pits and lands on the sides of the first and second substrates 2a and 2b forming the first and second record carriers 4a and 4b, respectively, on which the first and second recording layers 3a and 3b are formed, respectively. The first recording layer 3a is formed on the pit pattern 6a formed on the first record carrier 4a by forming a translucent or semi-reflective layer of SiN, $SiO_2$ or the like along the pit pattern 6a by evaporation, sputtering or the like. The first recording layer 3a reflects 20 to 50%, and transmits 30 to 80%, of a light beam incident upon it. The second recording layer 3b is formed on the pit pattern 6b formed on the second record carrier 4b by forming an aluminum evaporated layer or the like along the pit pattern 6b. The second recording layer 3b reflects 60% or more of an incident light, but it will reflect 20 to 50% of a light beam having passed through the first recording layer 3a and reflected from the second recording layer 3b.

From the optical disc 1 having the first recording layer 3a which is a translucent or semi-reflective as in the above, information recorded in the second recording layer 3b can be read by directing a light beam $L_2$ in the same direction as that in which a light beam $L_1$ is directed towards the first recording layer 3a as shown in FIG. 1. In this case, either information recorded in the first recording layer 3a or information recorded in the second recording layer 3b is selected for reading by changing the focused position of the light beams $L_1$ and $L_2$ directed towards the optical disc 1.

Also, as the optical disc having a plurality of recording layers, there has been proposed a one shown in FIG. 2. This example of optical disc is generally indicated with a reference 11. As shown in FIG. 2, the optical disc 11 includes a first record carrier 14a having a first recording layer 13a formed on one side of a first substrate 12a which is light-transmissive and a second record carrier 14b having a second recording layer 13b formed on one side of a second substrate 12b which is also light-transmissive. The first and second record carriers 14a and 14b are joined to each other with an adhesive layer 15 of a light-transmissive, ultraviolet-settable resin or the like. They are joined in parallel with each other so that the second substrate 12b is disposed above the first recording layer 13a. On the second recording layer 13b, there is provided a protective layer 17 for the second recording layer 13b.

Information such as audio information or the like is recorded as pit patterns 16a and 16b each defined by tiny pits and lands on the sides of the first and second substrates 12a and 12b forming the first and second record carriers 14a and 14b, respectively, on which the first and second recording layers 13a and 13b are formed, respectively. The first recording layer 13a transmits only a light beam having a predetermined wavelength while reflecting a light beam having any other wavelength. It is formed on and along the pit pattern 16a formed on the first record carrier 14a. The first recording layer 13a is formed to have a multilayered structure consisting of five layers of $Si_3N_4$, $SiO_2$, $Si_3N_4$, $SiO_2$ and $Si_3N_4$, respectively, for example. The first recording layer 13a reflects approximately 34% of a light beam of 635 nm in wavelength while reflecting little of a light beam of 780 nm in wavelength.

On the pit pattern 16b formed on the second record carrier 14b, there is formed the second recording layer 13b by forming a highly reflective aluminum evaporated layer or the like along the pit pattern 16b. The second recording layer 13b reflects 80% or more of a light beam having passed through the first recording layer 13a. It reflects 84% or more of a light beam of 780 nm in wavelength, most of which is transmitted through the first recording layer 13a, while reflecting about 38% of a light beam of 635 nm in wavelength, of which about 34% is reflected by the first recording layer 13a.

In case of the optical disc 11 constructed as in the above, a light beam is directed from the side of the first substrate 12a of the first record carrier 14a to read information recorded in the first and second recording layers 13a and 13b. At this time, a light beam $L_3$ of 780 nm in wavelength, used to read the information, will be transmitted through the first recording layer 13a and incident upon the second recording layer 13b, and a portion of the light beam will be reflected as a return light from the second recording layer 13b. By detecting the return light, information such as the audio information or the like recorded in the second recording layer 13b is read. Since the light beam $L_3$ of 780 nm in wavelength is used to play back a so-called compact disc which is a read-only optical disc of 12 cm in diameter, information recorded in the second recording layer 13b can be read by a general-purpose or versatile optical disc player.

Also, a light beam $L_4$ of 635 nm in wavelength, directed from the side of the first substrate 12a of the first record carrier 14a, will be reflected from both the first and second recording layers 13a and 13b to provide a return light each. More specifically, since the first reflecting layer 13a reflects about 34% of a light beam of 635 nm in wavelength, the light beam will pass through the first recording layer 13a and incident upon the second recording layer 13b to provide a return light from the second recording layer 13b. The second recording layer 13b reflects approximately 34% of the light beam incident upon it.

By focusing the light beam $L_4$ of 635 nm in wavelength on either the first or second recording layer 13a or 13b of the optical disc 11, information recorded in either the first or second recording layer 13a or 13b can be read.

In case of the optical disc 1 in which the first and second record carriers 4a and 4b are joined to each other with the sides thereof on which the first and second recording layers 3a and 3b are formed, respectively, being opposite to each other as shown in FIG. 1, information recorded in either the first or second recording layer 3a or 3b can selectively be read by focusing a light beam on either the first or second recording layer 3a or 3b of the optical disc 1. Since in the optical disc 1, the first and second recording layers 3a and 3b are disposed close to each other, an error will possibly take place in detecting the focused position of a light beam to detect the first or second recording layer 3a or 3b. It will be difficult to positively focus the light beam on the first or second recording layer 3a or 3b and thus it is not possible to accurately read any desired information from the optical disc 1.

Also it has been proposed to select either the first or second recording layer 3a or 3b by detecting a difference in reflectance between the first and second recording layers 3a and 3b to detect on which of the first and second recording layers 3a and 3b a light beam incident upon the optical disc 1 is focused. Also in this case, since the first and second recording layers 3a and 3b has the nearly same reflectance for the light beam incident upon the optical disc 1, the difference in reflectance for the light beam cannot be used to select either the first or second recording layer 3a or 3b.

In case of the optical disc 11 having the first recording layer 13a which transmits only a light beam having a predetermined wavelength while reflecting a light beam having any other wavelength, as shown in FIG. 2, information recorded in the first recording layer 13a can be read by the versatile optical disc player in which a compact disc is to be used. To read information recorded in the first and second recording layers 13a and 13b, a dedicated optical disc player using a light beam of 635 nm in wavelength is necessary. Since the first and second recording layers 13a and 13b have the nearly same reflectance for the light beam incident upon the optical disc 11, either the first or second recording layer 13a or 13b cannot be selected by detecting the difference in reflectance of the recording layers for the light beam.

As in the above, although the optical discs having so far been proposed have formed therein a plurality of recording layers for recording an increased amount of information, desired information cannot be read easily and accurately because it is difficult to focus a light beam accurately on a selected one of a plurality of recording layers.

DISCLOSURE OF THE INVENTION

Accordingly, it is an object of the present invention to overcome the above-mentioned drawbacks of the prior art by providing an optical recording medium recorder and/or player for playback of information recorded in an optical recording medium having formed therein a plurality of recording layers intended for an increased recording capacity, adapted to easily select each of the recording layers and positively read information recorded in a desired recording layer.

It is another object of the present invention to provide a focus servo pull-in method and unit enabling to focus a light beam on a desired one of a plurality of recording layers formed in an optical recording medium and positively read information recorded in the recording layer on which the light beam is focused.

It is still another object of the present invention to provide an optical recording medium playback method for selectively reading, with a light beam, a plurality of recording layers formed in the optical recording medium.

The above object can be attained by providing an optical disc recorder and/or player including according to the present invention:

an optical pickup having a photodetector to direct a light beam towards any one of a plurality of recording layers formed one over the other in the optical disc and detect a return portion of the light beam reflected back from the recording layer; and an identifier to compare output signal from the photodetector with a predetermined reference value and identify, based on the comparison result, which of the plurality of recording layers in the optical disc has focused thereon the light beam from the optical pickup.

Also the above object can be attained by providing an optical disc recorder and/or player including according to the present invention:

an optical pickup including:

a light source to emit a light beam for incidence upon any one of a plurality of recording layers formed one over the other in the optical disc and different in reflectance from each other;

an objective lens to converge the light beam emitted from the light source to any one of the plurality of recording layers; and a photodetector including a plurality of detector blocks to detect a return portion of the light beam reflected back from the recording layer;

a signal generator to generate, from output signals from the detector blocks of the photodetector, a focus error signal and a signal indicative of a sum of the output signals from the detector blocks; and a controller including a servo control block to move the objective lens optical-axially thereof based on the focus error signal from the signal generator; and an identifier to identify, based the focus error signal and sum signal from the signal generator, which of the plurality of recording layers in the optical disc has focused thereon the light beam from the optical pickup.

In the above optical disc recorder and/or player, the identifier identifies which of the plurality of recording layers in the optical disc has focused thereon the light beam from the optical pickup, depending on whether when the focus error signal from the signal generator is at a predetermined signal level, the level of the sum signal from the signal generator is below a threshold for any of the plurality of recording layers formed in the optical disc. Also, the identifier identifies which of the plurality of recording layers in the optical disc has focused thereon the light beam from the optical pickup, depending on whether when the focus error signal from the signal generator crosses the signal zero level, the level of the sum signal from the signal generator is below the threshold for any of the plurality of recording layers formed in the optical disc.

Also the above object can be attained by providing a focus servo controller including according to the present invention:

a servo control block for servo control to move an objective lens optical-axially thereof based on a focus error signal generated from an output signal from each of detector blocks of a photo detector which detects a return portion of a light beam reflected from any of a plurality of recording layers formed one over the other in an optical disc and different in reflectance from each other; and an identifier to identify, based on the focus error signal and the sum of output signals from the detector blocks, which of the plurality of recording layers in the optical disc has focused thereon the light beam from an optical pickup.

Also the above object can be attained by providing a focus servo pull-in method including, according to the present invention, steps of:

generating a focus error signal and a sun signal from output signals from detector blocks of a photodetector to detect a reflected return portion of a light beam incident through an objective lens upon any of a plurality of recording layers formed one over the other in an optical disc and different in reflectance from each other;

identifying, based on the focus error signal and sum signal, which of the plurality of recording layers in the optical disc has focused thereon the light beam from an optical pickup; and closing a servo loop to move the objective lens optical-axially thereof based on the focus error signal.

These objects and other objects, features and advantages of the present invention will become more apparent from the following detailed description of the preferred embodiments of the present invention when taken in conjunction with the accompanying drawings.

BEST MODE FOR CARRYING OUT THE INVENTION

The optical recording medium recording and/or playback apparatus and method, optical recording medium focus servo pull-in method and focus servo controller, according to the present invention, will be described in detail herebelow:

First, an optical recording medium for use with the optical recording medium recording and/or playback method, focus servo pull-in method and focus servo controller according to the present invention, will be described below.

Figure 1:
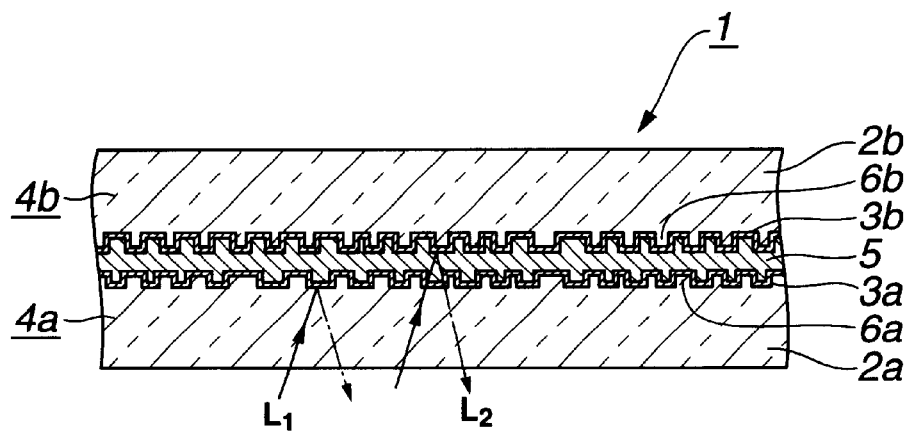
FIG. 1 is a sectional view of a conventional optical disc.
Figure 2:
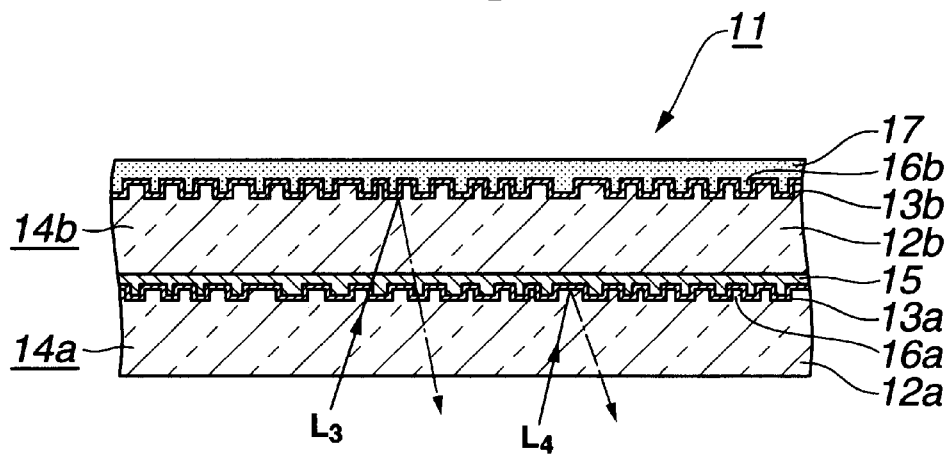
FIG. 2 is a sectional view of another conventional optical disc.
Figure 3:
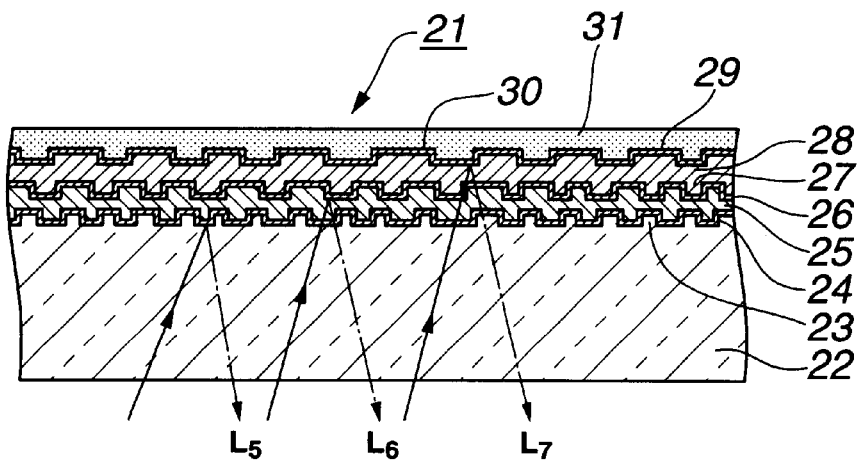
FIG. 3 is a sectional view of an optical disc for use with the present invention.

The optical recording medium is an optical disc which is generally indicated with a reference 21. As shown in FIG. 3, the optical disc 21 includes a substrate 22 of a synthetic resin such as light-transmissive polycarbonate, or glass. The substrate 22 has formed on one side thereof a pit pattern 23 of tiny pits and lands corresponding to recorded information. In case the substrate 22 is formed from a synthetic resin, the pit pattern 23 is formed by replication from a stamper during injection molding of the substrate 22. In case the substrate 22 is formed from glass, the pit pattern 23 is formed using the 2P (photo polymerization) method. In the 2P method, a light-settable resin such as an ultraviolet-settable resin is charged between a glass substrate and disc stamper, the light-settable resin is set or cured by ultraviolet rays irradiated from the glass substrate side, and thus a pattern of pits and lands on the stamper is replicated to form the pit pattern 23.

The substrate 22 of the optical disc 21 for use with the optical recording medium recording and/or playback method, focus servo pull-in method and focus servo controller according to the present invention is formed from a polycarbonate resin by injection molding. As mentioned above, the substrate 22 has recorded on one side thereof information in the form of the pit pattern 23 whose a plurality of pits defines a spiral recording track or concentric recording tracks. The substrate 22 is formed to have a diameter of 12 cm and a thickness of about 1.2 mm similarly to the substrate of a so-called compact disc being a conventional optical disc whose diameter is 12 cm.

As shown in FIG. 3, a first recording layer 24 is formed on the one side of the substrate 22, on which the pit pattern 23 is formed, to cover the pit pattern 23. The first recording layer 24 is a translucent or semi-reflective layer which transmits a constant quantity, and reflects a constant quantity, of the light beam directed from the side of the substrate 22. For example, the first recording layer 24 is formed from silicone layers of $Si_3N_4$, $SiO_2$ and the like, respectively, to a thickness of about 100 to 500 nm. Namely, the first recording layer 24 is formed from the multiple layers of $Si_3N_4$, $SiO_2$ and the like, respectively, to have a multilayered structure on the substrate 22. The $Si_3N_4$, $SiO_2$ and other layers are formed on the substrate 22 by vacuum evaporation or sputtering.

The first recording layer 24 has formed thereon a first intermediate layer 25 of a light-transmissive ultraviolet-settable resin or the like, and a second recording layer 26 formed on the first intermediate layer 25. The first intermediate layer 25 is formed to have a predetermined thickness which optically separates the first and second recording layers 24 and 26 from each other so that they will not be positioned within the depth of focus of an objective lens which focuses the light beam on the recording layers 24 and 26. More specifically, the first intermediate layer 25 is formed 30 $\mu$m or so thick for example. If the first intermediate layer 25 is formed too thin, the first and second recording layers 24 and 26 will be positioned within the depth of focus of the objective lens which will further be described later and thus the reflected light from the first recording layer 24 and that from the second recording layer 26 cannot be separated sufficiently from each other. In this case, it will be difficult to accurately detect the reflected light from each of the recording layers 24 and 26. On the contrary, if the first intermediate layer 25 is formed too thick, a spherical aberration will take place. Taking the above in consideration, the first intermediate layer 25 is formed to have an appropriate thickness.

The first intermediate layer 25 is formed by applying a light-transmissive ultraviolet-settable resin or the like to the first recording layer 24 by the spin coat method and irradiating ultraviolet rays to the applied resin to cure the latter. Otherwise, the first intermediate layer 25 may be formed on the first recording layer 24 by applying the ultraviolet-settable resin or the like to a thickness of 5 to 10 μm on the first recording layer 24 and repeating this more than once to provide a lamination of the resin layers. Moreover, the first intermediate layer 25 may be a transparent sheet attached on the first recording layer 24.

The first intermediate layer 25 has formed on one side thereof a pit pattern 27 of tiny pits and lands corresponding to information recorded on the second recording layer 26. Similarly to the pit pattern 23, the pit pattern 27 is formed from a plurality of pits defining a spiral recording track or concentric recording tracks. The pit pattern 27 can be formed by the 2P method used to form the pit pattern 23 on a glass substrate as mentioned above. More specifically, the stamper is pressed to an ultraviolet-settable resin applied by the spin coat method or a laminated transparent sheet, and ultraviolet rays are irradiated from the side of the substrate 22 for example to replicate a pit pattern of the stamper to the resin or transparent sheet, thereby forming the pit pattern 27 in the first intermediate layer 25.

The second recording layer 26 is formed on and along the pit pattern 27 formed on one side of the first intermediate layer 25, thus covering the pit pattern 27. The second recording layer 26 transmits a constant quantity, and reflects a constant quantity, of the light beam directed from the side of substrate 22 and having passed through the first recording layer 24. Namely, the second recording layer 26 is a translucent or semi-reflective layer. Similar to the first recording layer 24, the second recording layer 26 is formed from silicone layers of $Si_3N_4$, $SiO_2$ and the like, respectively, to a thickness of about 100 to 500 nm on the first intermediate layer 25. Namely, the second recording layer 26 is formed from the multiple layers of $Si_3N_4$, $SiO_2$ and the like, respectively, to have a multilayered structure on the first intermediate layer 25. The $Si_3N_4$, $SiO_2$ and other layers are formed on the first intermediate layer 25 by vacuum evaporation or sputtering.

Further, a third recording layer 29 is formed over the second recording layer 26 with a second intermediate layer 28 formed between the second and third recording layers 26 and 29. The second intermediate layer 28 is formed from a light-transmissive ultraviolet-settable resin or the like. Similar to the first intermediate layer 25, the second intermediate layer 28 is formed to have a predetermined thickness which optically separates the second and third recording layers 26 and 29 from each other so that they will not be positioned within the depth of focus of an objective lens which focuses the light beam on the recording layers 26 and 29. More specifically, the second intermediate layer 28 is formed 30 μm or so thick for example.

Similarly to the first intermediate layer 25, the second intermediate layer 28 is formed by applying a light-transmissive ultraviolet-settable resin or the like to the second recording layer 26 by the spin coat method and irradiating ultraviolet rays to the applied resin to cure the latter. Otherwise, the second intermediate layer 28 may be formed on the second recording layer 26 by applying the ultraviolet-settable resin or the like to a thickness of 5 to 10 μm on the second recording layer 26 and repeating this more than once to provide a lamination of the resin layers. Moreover, the second intermediate layer 28 may be a transparent sheet attached on the second recording layer 26.

The second intermediate layer 28 has formed on one side thereof a pit pattern 30 of tiny pits and lands corresponding to information recorded on the third recording layer 29. Similarly to the pit patterns 23 and 27, the pit pattern 30 is formed from a plurality of pits defining a spiral recording track or concentric recording tracks. The pit pattern 30 can also be formed by the method used to form the pit pattern 27 on the first intermediate layer 25.

The third recording layer 29 is formed on and along the pit pattern 30 formed on one side of the second intermediate layer 28, thus covering the pit pattern 30. Specifically, the third recording layer 29 is formed from a highly reflective metal such as aluminum (Al), gold (Au), silver (Ag) or the like to reflect to the optical pickup which will further be described later the light beam having passed through the first and second recording layers 24 and 26 formed as translucent or semi-reflective layers. The third recording layer 29 has formed thereon a protective layer 31 formed from an ultraviolet-settable resin or the like to protect the surface of the third recording layer 29. The protective layer 31 is formed by applying the ultraviolet-settable resin or the like to the second intermediate layer 28 by the spin coat method and then irradiating ultraviolet rays to the applied resin to cure the latter.

The optical disc 21 for use with the present invention has been described in the foregoing concerning a one whose first and second intermediate layers 25 and 28 are formed by the 2P method. However, the first and second intermediate layers 25 and 28 may be formed by any other method. For example, sheets having the pit pattern 27 and 30, respectively, formed on one side thereof and also a translucent or semi-reflective layer or a highly reflective metal layer of aluminum (Al), gold (Au), silver (Ag) or the like formed along the pit patterns 27 and 30, respectively, may be formed as the second or third recording layer 26 or 29, and they may be joined one over the other to the upper side of the first recording layer 24.

From the optical disc 21 for use with the present invention, information recorded in any of the first to third recording layers 24, 26 and 29 is read by directing a light beam from the side of the substrate 22 and detecting a return light reflected by that recording layer 24, 26 or 29 by a photodetector of an optical pickup disposed at the side of the substrate 22. To this end, the first recording layer 24 is formed from a translucent or semi-reflective layer which transmits a predetermined quantity of the directed light beam towards the second and third recording layers 26 and 29, and the third recording layer 29 is from a highly reflective layer which reflects the light beam having passed through the first and second recording layers 24 and 26 and incident thereupon.

In the optical disc 21, the first recording layer 24 is formed to reflect about 5% of the light beam incident upon the substrate 22 as a return light $L_5$. The second recording layer 26 is formed to reflect about 20% of the light beam incident upon the substrate 22 as a return light $L_6$. The third recording layer 29 is formed to reflect about 60% of the light beam incident upon the substrate 22 as a return light $L_7$.

Owing to the differences in reflectance among the first, second and third recording layers 24, 26 and 29, there can be large differences in quantity of light among the return portions $L_5$, $L_6$ and $L_7$ of the light beam, incident upon and reflected by the first, second and third recording layers 24, 26 and 29. Namely, by detecting the differences among the return portions $L_5$, $L_6$ and $L_7$ of the incident light beam upon the optical disc 21, it is possible to easily detect which of the first, second and third recording layers 24, 26 and 29 has focused thereon the light beam incident upon the optical disc 21, as will further be described later.

For positive detection of which of the first, second and third recording layers 24, 26 and 29 has focused thereon the incident light beam on the optical disc 21 by detecting the differences in quantity of light among the return portions $L_5$, $L_6$ and $L_7$ of the incident light beam from the first, second and third recording layers 24, 26 and 29, there should desirably be a difference of 15% or more in reflectance among the first, second and third recording layers 24, 26 and 29. Therefore, the first, second and third recording layers 24, 26 and 29 are formed for the difference in ratio of return portion of the incident light beams among them to be 15% or more.

When the third recording layer 29 reflects about 60% of the light beam incident upon the substrate 22 as the return light $L_7$, it can be read by an optical disc player which requires the recording layer of a conventional optical disc to have a high reflectance, such as a so-called compact disc player. The optical disc 21 having such a highly reflective recording layer for use with the present invention is interchangeable with a conventional optical disc having such a highly reflective recording layer, namely, the so-called compact disc, and can be played with a widely prevailing optical disc player, namely, the so-called compact disc player.

Note that although the optical disc 21 for use with the present invention has constructed to have the three recording layers, it may be constructed to have more than two or three recording layers. In this case as well, the recording layers should desirably be formed the difference in ratio of the return portion of the incident light beam among them to be 15% or more.

Next, an optical disc player capable of reading information recorded in the optical disc 21 having the first, second and third recording layers 24, 26 and 29 as having been described the foregoing, will be described.

Figure 4:
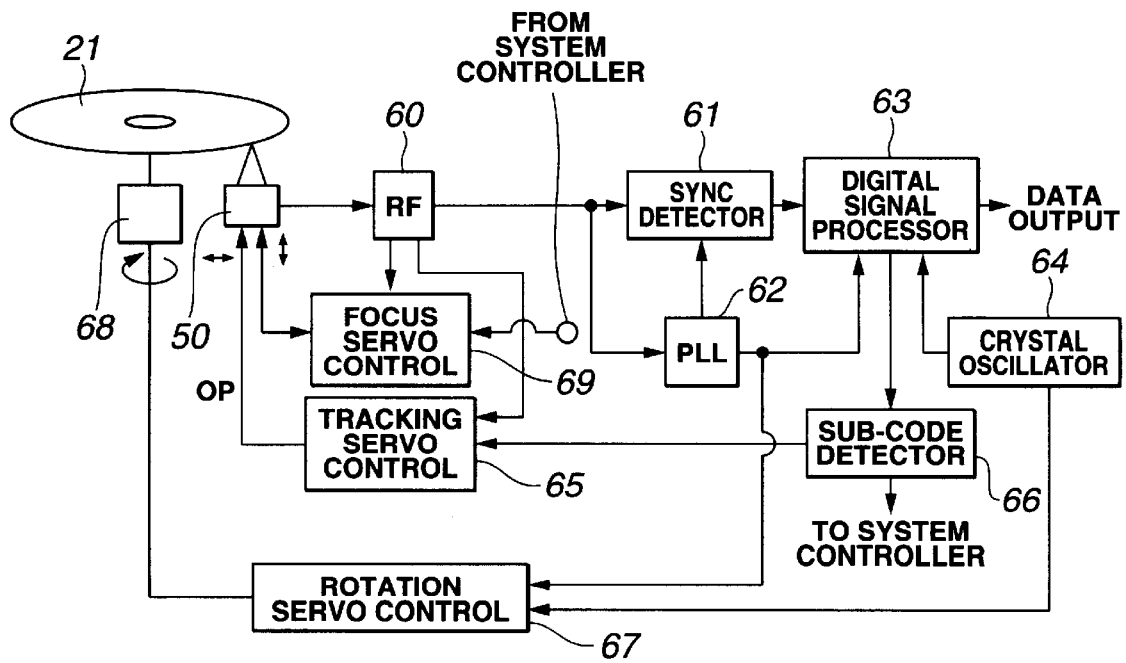
FIG. 4 is a block diagram of an optical disc player according to the present invention.

Referring now to FIG. 4 for example, an optical disc player is illustrated in the form of a block diagram. As shown, the optical disc player includes an optical pickup 50 to emit a light beam towards the optical disc 21 and provide a read signal (will be referred to as "RF signal" hereinafter) generated based on a return light from the optical disc, a sync detection circuit 61 to detect a sync component of the RF signal from the optical pickup 50, a phase lock loop circuit 62 (will be referred to as "PLL circuit" hereinafter) to extract a clock signal synchronous with the RF signal from the optical pickup 50, and a digital signal processing circuit 63 to process data from the sync detection circuit 61 in a predetermined manner and provide a read data.

The optical pickup 50 includes a laser source such as a semiconductor laser element or the like, objective lens, actuator to move the objective lens optical-axially and radially of the optical disc 21, photodetector which will further be described) (these elements are not shown), etc. Output signal from the photodetector is supplied to an RF circuit 60. The RF circuit 60 generates and provides as an output an RF signal based on the output signal from the optical pickup 50 and a focus error signal based on the astigmatic method using a cylindrical lens disposed in the optical path of the return light reflected from the optical disc 50 for example and a tracking error signal based on the so-called 3P method for example. The PLL circuit 62 reproduces a clock signal synchronous with a clock component of data included in the RF signal supplied from the RF circuit 60 and supplies it to the sync detection circuit 61 and digital signal processing circuit 63. The sync detection circuit 61 detects a sync signal included in the RF signal supplied from the RF circuit 60 based on the clock signal from the PLL circuit 62, pulls in the synchronization, and supplies the RF signal having pulled in the synchronization to the digital signal processing circuit 63. The digital signal processing circuit 63 uses the clock signals supplied from the PLL circuit 62 and a crystal oscillator 64, respectively, to demodulate the supplied RF signal by the modulating method corresponding to the EFM (eight to fourteen modulation) method used at the time of data write to the optical disc, while making an error correction by an error correction method corresponding to the encoding method, such as the interleave, Reed-Solomon code or the like, used at the time of data write to the optical disc, thereby generating a read digital signal and providing it as an output. The read digital signal may be supplied to a D/A converter (not shown) as necessary to provide it as an analog signal.

As shown in FIG. 4, the optical disc player further includes a tracking servo control circuit 65 to provide a tracking servo control based on the tracking error signal from the RF circuit 60, a rotation servo control circuit 67 to rotate the optical disc 21 at a constant linear velocity for example based on the reference clock signal from the crystal oscillator 64 and clock signal from the PLL circuit 62, a spindle motor 68 to rotate the optical disc 21, and a focus servo control circuit 69 to provide a focus servo control based on the focus error signal from the RF circuit 60.

The rotation servo control circuit 67 generates and supplies to a spindle motor 68, based on the reference clock signal from the crystal oscillator 64 and clock signal from the PLL circuit 62, such a drive current that the velocity of the laser spot from the optical pickup 50 in relation to the optical disc 21 will be a constant linear velocity. The spindle motor 68 drives to rotate the optical disc 21 at the constant linear velocity.

The optical disc player further includes a sub-code detection circuit 66 which detects a sub-code included in the RF signal from the RF circuit 60 to detect a current track position of the optical pickup 50 in relation to the optical disc 21 and supplies information indicative of the detected track position to a feed mechanism (not shown) of the optical pickup 50. The tracking servo control circuit 65 provides a servo control based on the tracking error signal from the optical pickup 50 to move the objective lens of the optical pickup 50 in such a disc-radial direction that the tracking error signal will be "zero", namely, in a direction perpendicular to the optical axis of the objective lens. Thereby, the laser spot directed from the optical pickup 50 to the optical disc 21 will accurately scan a recording track on the optical disc 21. The tracking servo control circuit 65 will open the tracking servo loop when accessing the recording track, move the optical pickup 50 radially of the optical disc 21 by the feed mechanism (not shown) based on the information indicative of the track position, supplied from the sub-code detection circuit 66, and closes the tracking servo loop after the optical pickup 50 reaches the track position indicated by the information supplied from the sub-code detection circuit 66.

As a result of the operation of an operation unit (not shown) by the user, or based on a command from a host computer, a system controller instructs the focus servo control circuit 69 to read data from any of the three recording layers, first, second and third (24, 26 and 29, respectively, provided in the optical disc 21.

Figure 5:
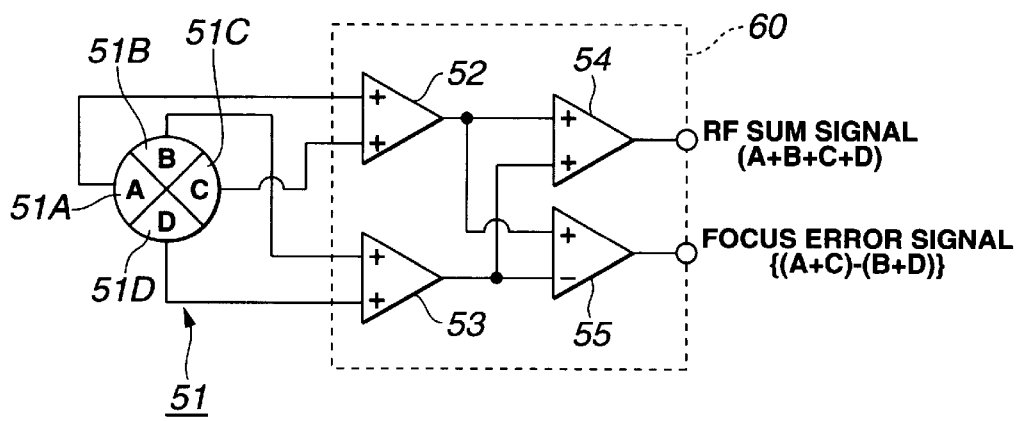
FIG. 5 is a circuit diagram of a photodetector to detect a focus error signal and a focus error signal generation circuit.

The optical pickup 50 includes a photodetector 51. As shown in FIG. 5 for example, the photodetector 51 is comprised of four detector blocks 51A, 51B, 51C and 51D. The RF circuit 60 includes an amplifier 52 to add together outputs from the detector blocks 51A and 51C, respectively, an amplifier 53 to add together outputs from the detector blocks 51B and 51D, respectively, an amplifier 54 to add together outputs from the amplifiers 52 and 53, respectively, and a differential amplifier 55 to subtract the output of the amplifier 53 from that of the amplifier 52.

The amplifier 52 adds together the output from the detector block 51A (this output will be referred to as "A" hereinafter) and that from the detector block 51C (this will be referred to as "C" hereinafter), and supplies the result (A+C) to the amplifiers 54 and 55, respectively. The amplifier 53 adds together the output from the detector block 51B (this output will be referred to as "B" hereinafter) and that from the detector block 51D (this output will be referred to as "D" hereinafter), and supplies the result (B+D) to the amplifiers 54 and 55. The amplifier 54 adds together the output (A+C) from the amplifier 52 and that (B+D) from the amplifier 53, and supplies the result (A+B+C+D), that is, the RF signal to the sync detection circuit 61 as in the above and also to the focus servo control circuit 69. On the other hand, the differential amplifier 55 subtracts the output (B+D) of the amplifier 53 from the output (A+C) of the amplifier 52 and supplies the result {(A+C)–(B+D)}, that is, the focus error signal, to the focus servo control circuit 69.

After moving optical-axially the objective lens for a focusing near a recording layer in the optical disc 21, which is designated by the system controller, the focus servo control circuit 69 provides a focus servo control based on the focus error signal from the amplifier 55 so that the focus error signal will be zero. For example, the focus servo control circuit 69 will generate a focus servo signal based on the supplied focus error signal and supplies it to an actuator of the optical pickup 50, and the actuator will move the objective lens optical-axially of the objective lens.

Figure 6:
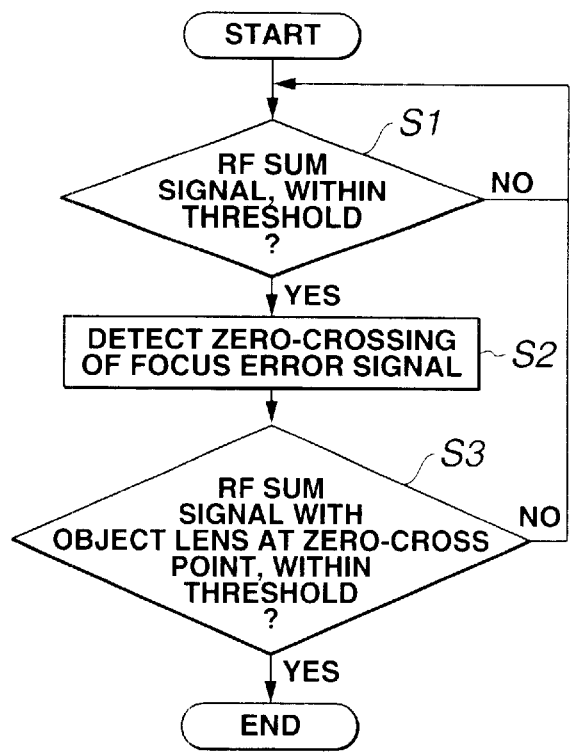
FIG. 6 is a flow chart of operations effected in the focus servo pull-in operation to focus a light beam to any one of a plurality of recording layers provided in the optical disc.

Next, operation of pulling in the focus servo control of the focus servo control circuit 69 to each of the recording layers 24, 26 and 29 in the optical disc 21 will be described below with reference to a flow chart in FIG. 6 and an RF signal and so-called S curve shown in FIG. 7.

The first, second and third recording layers 24, 26 and 29 in the optical disc 21 reflects 5%, 20% and 60%, respectively, of the light beam incident upon the optical disc 21 through the objective lens of the optical pickup 50 as having previously been described. So, when the objective lens is moved in one direction parallel to the optical axis of the objective lens near and over the focused position of the light beam on each recording later, the RF signal and S curve of the focus error signal for each of the first, second and third recording layers 24, 26 and 29 will have three peak levels and amplitudes, small, medium and large, respectively, corresponding to their respective reflectance as shown in FIG. 7.

After the focus servo control circuit 69 moves the objective lens optical-axially thereof so that the light beam is focused near one of the recording layers in the optical disc 21, that is designated by the system controller (not shown), it will move the objective lens in one direction parallel to the optical axis thereof over the focused position of the light beam. At step S1, the focus servo control circuit 69 judges whether the RF signal generated at this time is smaller than a predetermined threshold for the designated recording layer, namely, the maximum value for that recording layer. If the focus servo control circuit 69 determines the RF signal to be smaller than the threshold (YES), it will go to step S2. On the contrary, when the focus servo control circuit 69 determines the RF signal not to be smaller than the threshold (NO), it will go back to step S1. Note that the method for moving the objective lens to near a desired one of the recording layers is to supply from the focus servo control circuit 69 to the actuator of the optical pickup 50 a signal, for example, a DC signal, to move the objective lens optical-axially thereof. In this embodiment, a DC signal level is previously recorded for each of the recording layers 24, 26 and 29 in the optical disc 21 and the signal level is selected by the system controller (not shown) for one of the recording layers 24, 26 and 29 on which the light beam is focused by the objective lens.

At step S2, the focus servo control circuit 69 determines an optical-axial position of the objective lens corresponding to point at which each of the S curve of the focus error signal crosses the level 0 (this position will be referred to as "zero-cross position" hereinafter), and then goes to step S3.

At step S3, the focus servo control circuit 69 will judge whether the RF signal which will be when the objective lens is at the zero-cross position is smaller than a threshold $TH_1$ for reading data from the first recording layer 24 for example, smaller than a threshold $TH_2$ for reading data from the second recording layer 26 for example, and smaller than a threshold $TH_3$ for reading data from the third recording layer 29 for example. When any of the judgments is OK, the focus servo control circuit 69 takes that data is to be read from the recording layer in consideration, and closes the focus servo loop. The result of judgment is supplied to the system controller (not shown) for use in a servo gain control and the like. When a desired one of the recording layers 24, 26 and 29 of the optical disc 21 is thus selected, the selected recording layer is subjected to focus servo control and tracking servo control, and data recorded in the selected recording layer is read. The focus servo control is effected with the above-mentioned DC signal added as an offset signal component to a focus error signal from the optical pickup 50 and supplied to the actuator of the optical pickup 50.

If the RF signal which will be-when the objective lens is at the zero-cross position is determined, at step S3, not to be smaller than the threshold for the selected recording layers 24, 26 or 29, the focus servo control circuit 69 will go back to step S1 and repeat the operations at steps S1 to S3.

With the rotation, tracking and focus controlled by the respective servo control circuits, respectively, as in the above, the focus servo loop for focusing the light beam on a desired one of the recording layers 24, 26 and 29 in the optical disc 21 is closed. After the focus servo is thus pulled in, information such as audio information and the like recorded in the desired one of the recording layers 24, 26 and 29 in the optical disc 21 is read. At this time, a selection is made between the gains of the tracking and focus servos by the system controller (not shown) based on the result of judgment on which of the recording layers 24, 26 and 29 in the optical disc 21 has focused thereon the incident light beam on the optical disc 21.

Figure 7:
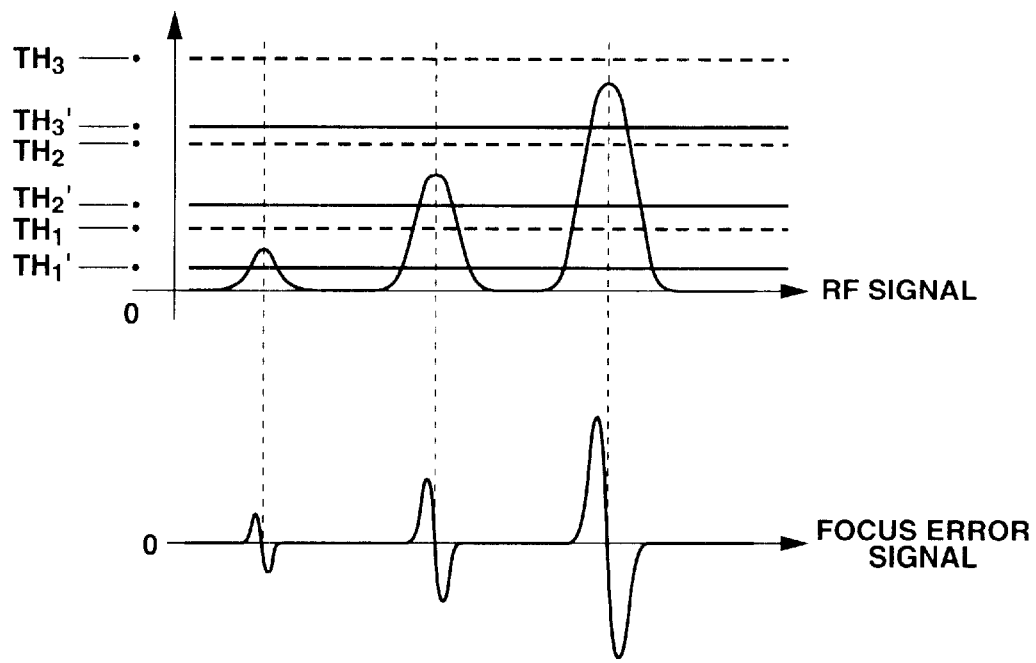
FIG. 7 shows waveforms of RF signal and focus error signal detected from each of the recording layers in the optical disc.

Note that the present invention is not limited to the embodiment having been described in the foregoing, but upper and lower limits such as thresholds $TH_1$ and $TH_1'$, $TH_2$ and $TH_2'$, and $TH_3$ and $TH_3'$ may be set for the RF signal from each of the recording layers 24, 25 and 26 as shown in FIG. 7. For example, the object lens may be moved for the light beam to focused between the first recording layer 24 located at the side of the optical disc 21 upon which the light beam is incident and the third recording layer 28 located over the first recording layer 24 and then moved optical-axially hereof instead of moving the objective lens optical-axially thereof to near the focused position of the light beam on a first designated recording layer, to judge which of the recording layers has focused thereon the incident light beam upon the optical disc 21.

Also, the method for generation of the focus error signal is not limited to the aforementioned astigmatic method but may be any other one.

The present invention has been described in the above concerning the optical disc 21 having the three recording layers. Also with an optical disc having two recording layers, the focus servo control of the light beam for each of the recording layers can be pulled in as in the above. The light beam to be focused on a selected recording layer is subjected to a focus servo control and tracking servo control to read data recording in that recording layer.

Of course, the present invention may be applied to an optical disc player as well as to an optical disc recorder adapted to write data to an optical disc having formed therein a plurality of recording layers at least one of which is formed from a data-recordable material including data-rewritable type materials such as a magneto-optical recording material and phase-change recording material, and a recordable type recording material using an organic dye.

Industrial Applicability

As having been described in the foregoing, according to the present invention, a light beam is emitted from a light source to an optical disc having a plurality of recording layers formed one over the other, a return light from any of the recording layers in the optical disc is detected by a photodetector, and a peak level of the output from the photodetector is compared with a threshold set for each of the recording layers in the optical disc to determine which of the recording layers in the optical disc the return light comes from. When the light beam is focused on that recording layer, a focus servo loop is closed to read information recorded in that recording layer. Thus, it is possible to positively read information recorded in a desired recording layer.

Also, the optical recording medium for use with the present invention has at least first and second recording layers formed one over the other on a light-transmissive substrate. The first and second recording layers are formed to be so different in reflectance from each other that it can be known based on the signal level based on the return portion of the incident light beam upon the optical disc which of the recording layers has the incident light beam focused thereon. Thus, these recording layers can easily be discriminated from each other by detecting the return light from each of them.

What is claimed is:

1. An optical disc recorder and/or player comprising:
an optical pickup having a photodetector for directing a light beam towards any one of a plurality of recording layers each having different reflectances and formed one over another in an optical disc, and for detecting a peak level of a return portion of the light beam reflected back from one of the plurality of recording layers and producing an output signal; and
an identifier for comparing the peak level detected by the photodetector to pre-set upper and lower thresholds set for each of the plurality of recording layers and for identifying, based on a comparison result, the one of the plurality of recording layers in the optical disc having focused thereon the light beam from the optical pickup.

2. The optical disc recorder and/or player as set forth in claim 1, wherein the identifier identifies whether the output signal from the photodetector is below a predetermined threshold for any one of the plurality of recording layers formed in the optical disc.

3. The optical disc recorder and/or player as set forth in claim 2, further comprising
a signal generator to generate a focus error signal from the output signal from the photodetector of the optical pickup;
the identifier identifying, based on the focus error signal from the signal generator and the output signal from the photodetector, which one of the plurality of recording layers in the optical disc has focused thereon the light beam from the optical pickup.

4. The optical disc recorder and/or player as set forth in claim 3, wherein the identifier identifies which one of the plurality of recording layers in the optical disc has focused thereon the light beam from the optical pickup, depending on whether when the focus error signal from the signal generator is at a predetermined signal level, a level of a sum signal from the signal generator is below a threshold for any one of the plurality of recording layers formed in the optical disc.

5. The optical disc recorder and/or player as set forth in claim 4, wherein the identifier identifies which one of the plurality of recording layers in the optical disc has focused thereon the light beam from the optical pickup, depending on whether when the focus error signal from the signal generator crosses a signal zero level, the level of the sum signal from the signal generator is below the threshold for any one of the plurality of recording layers formed in the optical disc.

6. The optical disc recorder and/or player as set forth in claim 3, wherein the photodetector includes the plurality of detector blocks, and the signal generator generates a focus error signal based on detection signals from the plurality of detector blocks in the photodetector.

7. An optical disc recorder and/or player comprising:
an optical pickup including:
a light source to emit a light beam for incidence upon any one of a plurality of recording layers formed one over another in an optical disc, wherein the plurality of recording layers have different respective reflectances;
an objective lens to converge the light beam emitted from the light source to any one of the plurality of recording layers; and
a photodetector including a plurality of detector blocks to detect a return portion of the light beam reflected back from one of the plurality of recording layers;
a signal generator to generate, from output signals from the detector blocks of the photodetector corresponding to the return portion of the reflected light beam, a focus error signal and a peak level of a sum of the output signals from the detector blocks;
a controller including a servo control block to move the objective lens optical-axially thereof based on the focus error signal from the signal generator; and
an identifier to identify, based on the focus error signal and the peak level of the sum signal from the signal generator, the one of the plurality of recording layers in the optical disc having focused thereon the light beam from the optical pickup by comparing the peak level generated by the signal generator to pre-set upper and lower thresholds set for each of the plurality of recording layers.

8. The optical disc recorder and/or player as set forth in claim 7, wherein the identifier judges whether the sum signal from the signal generator is below a predetermined threshold for any one of the plurality of recording layers in the optical disc.

9. The optical disc recorder and/or player as set forth in claim 8, wherein the identifier identifies which one of the plurality of recording layers in the optical disc has focused thereon the light beam from the optical pickup, depending on whether when the focus error signal from the signal generator is at a predetermined signal level, a level of the sum signal from the signal generator is below a threshold for any one of the plurality of recording layers formed in the optical disc.

10. The optical disc recorder and/or player as set forth in claim 9, wherein the identifier identifies which one of the plurality of recording layers in the optical disc has focused thereon the light beam from the optical pickup, depending on whether when the focus error signal from the signal generator crosses a signal zero level, the level of the sum signal from the signal generator is below a threshold for any one of the plurality of recording layers formed in the optical disc.

11. The optical disc recorder and/or player as set forth in claim 10, wherein the controller closes a servo loop of a servo control block based on an identification result.

12. A focus servo controller comprising:
a servo control block for servo control to move an objective lens optical-axially thereof based on a focus error signal generated from an output signal from a photodetector which detects a return portion of a light beam from an optical pickup reflected from any one of a plurality of recording layers formed one over another in an optical disc, wherein the plurality of recording layers have different respective reflectances; and
an identifier to identify, based on the focus error signal and a peak level of a sum of output signals from detector blocks of the photodetector, which one of the plurality of recording layers in the optical disc has focused thereon the light beam from the optical pickup by comparing the peak level detected by the photodetector to pre-set upper and lower thresholds set for each of the plurality of recording layers.

13. The focus servo controller as set forth in claim 12, wherein the identifier identifies whether the output signal from the photodetector is below a predetermined threshold for any one of the plurality of recording layers formed in the optical disc.

14. The focus servo controller as set forth in claim 13, wherein the identifier identifies which one of the plurality of recording layers in the optical disc has focused thereon the light beam from the optical pickup, depending on whether when the focus error signal from the signal generator is at a predetermined signal level, a level of the sum signal from the signal generator is below a threshold for any one of the plurality of recording layers formed in the optical disc.

15. The focus servo controller as set forth in claim 14, wherein the identifier identifies which one of the plurality of recording layers in the optical disc has focused thereon the light beam from the optical pickup, depending on whether when the focus error signal from the signal generator crosses a signal zero level, the level of the sum signal from the signal generator is below the threshold for any one of the plurality of recording layers formed in the optical disc.

16. The focus servo controller as set forth in claim 15, wherein the servo control block closes a servo loop of the servo control block based on an identification result.

17. A focus servo pull-in method comprising steps of:
generating a focus error signal and a sum signal from output signals from detector blocks of a photodetector to detect a reflected return portion of a light beam incident through an objective lens of an optical pickup upon any one of a plurality of recording layers formed one over another in an optical disc, wherein the plurality of recording layers have different respective reflectances;
identifying, based on the focus error signal and a peak level of the sum signal, which one of the plurality of recording layers in the optical disc has focused thereon the light beam from the optical pickup by comparing the peak level detected by the photodetector to pre-set upper and lower thresholds set for each of the plurality of recording layers; and
closing a servo loop to move the objective lens optical-axially thereof based on the focus error signal.

18. The focus servo pull-in method as set forth in claim 17, wherein the identification is effected after moving the objective lens optical-axially thereof so that the light beam is focused near any one of the plurality of recording layers formed in the optical disc.

19. The focus servo pull-in method as set forth in claim 18, wherein it is judged whether the sum signal from the signal generator is below a predetermined threshold for any one of the plurality of recording layers in the optical disc.

20. The focus servo pull-in method as set forth in claim 19, wherein it is identified which one of the plurality of recording layers in the optical disc has focused thereon the light beam from the optical pickup, depending on whether when the focus error signal from the signal generator is at a predetermined signal level, a level of the sum signal from the signal generator is below a threshold for any one of the plurality of recording layers formed in the optical disc.

21. The focus servo pull-in method as set forth in claim 20, wherein it is identified which one of the plurality of recording layers in the optical disc has focused thereon the light beam from the optical pickup, depending on whether when the focus error signal from the signal generator crosses a signal zero level, the level of the sum signal from the signal generator is below a threshold for any one of the plurality of recording layers formed in the optical disc.

22. An optical disc recording and/or playback method comprising steps of:
generating a sum signal from output signals from a plurality of detector blocks in a photodetector to detect a reflected return portion of a light beam incident through an objective lens of an optical pickup upon any one of a plurality of recording layers formed one over another in an optical disc, wherein the plurality of recording layers have different respective reflectances; and
identifying, based on a peak level of the sum signal, which one of the plurality of recording layers formed in the optical disc has focused thereon the light beam from the optical pickup by comparing the peak level detected by the photodetector to pre-set upper and lower thresholds set for each of the plurality of recording layers.

23. The optical disc recording and/or playback method as set forth in claim 22, wherein the identification is effected after moving the objective lens optical-axially thereof so that the light beam is focused near any one of the plurality of recording layers formed in the optical disc.

24. The optical disc recording and/or playback method as set forth in claim 23, wherein it is judged whether the sum signal from the signal generator is below a predetermined threshold for any one of the plurality of recording layers in the optical disc.

25. The optical disc recording and/or playback method as set forth in claim 24, wherein it is identified which one of the plurality of recording layers in the optical disc has focused thereon the light beam from the optical pickup, depending on whether when a focus error signal from the signal generator is at a predetermined signal level, a level of the sum signal from the signal generator is below a threshold for any one of the plurality of recording layers formed in the optical disc.

26. The optical disc recording and/or playback method as set forth in claim 25, wherein it is identified which one of the plurality of recording layers in the optical disc has focused thereon the light beam from the optical pickup, depending on whether when the focus error signal from the signal generator crosses a signal zero level, the level of the sum signal from the signal generator is below a threshold for any one of the plurality of recording layers formed in the optical disc.

* * * * *